United States Patent [19]

Harder

[11] Patent Number: 5,564,359
[45] Date of Patent: Oct. 15, 1996

[54] SAFETY APPARATUS FOR A SCHOOL BUS

[75] Inventor: Arthur J. Harder, Bartlett, Ill.

[73] Assignee: Bodyguard, Inc., Bourbonnais, Ill.

[21] Appl. No.: 386,423

[22] Filed: Feb. 10, 1995

[51] Int. Cl.⁶ .................................................. B60R 21/34
[52] U.S. Cl. ........................ 116/28 R; 280/762; 293/119
[58] Field of Search ............................ 116/28 R, 4, 51, 116/52, 53, 63 R, 35 R, 284; 293/117, 118, 119; 340/433, 487–490; 280/762

[56] References Cited

U.S. PATENT DOCUMENTS

| Re. 15,927 | 10/1924 | Schauman | 293/117 |
|---|---|---|---|
| 234,416 | 11/1880 | Mason et al. | |
| 504,485 | 9/1893 | Barnes | |
| 540,106 | 5/1895 | Mayolini | |
| 1,108,869 | 8/1914 | Russell | |
| 1,372,530 | 3/1921 | Mendelson | 116/51 |
| 1,655,978 | 1/1928 | Vella | 293/119 |
| 1,672,243 | 6/1928 | Blake | 293/118 |
| 1,816,120 | 7/1931 | Lea | |
| 2,789,854 | 4/1957 | Hope | 293/118 |
| 3,153,398 | 10/1964 | Runkle et al. | |
| 3,236,552 | 2/1966 | Percifull | |
| 4,688,824 | 8/1987 | Herring | |
| 4,697,541 | 10/1987 | Wicker | |
| 4,956,630 | 9/1990 | Wicker | |
| 5,132,662 | 7/1992 | Burch | |
| 5,199,754 | 4/1993 | Freeman | |
| 5,226,686 | 7/1993 | Triggs et al. | |
| 5,281,948 | 1/1994 | Estrada | 340/433 |
| 5,406,251 | 4/1995 | Leis | 340/433 |

Primary Examiner—William A. Cuchlinski, Jr.
Assistant Examiner—Andrew Hirshfeld
Attorney, Agent, or Firm—Leydig, Voit & Mayer, Ltd.

[57] ABSTRACT

Children entering or departing a school bus are prevented from entering a generally rectangular zone in front of the bus by a pair of forwardly extending and laterally spaced arms and by a flexible cable extending laterally between the free end portions of the arms. The arms are adapted to be folded inwardly into stored positions against the front bumper of the bus and, as an incident thereto, the cable is automatically retracted into the arms. If a child hits an arm or the cable, or if the arms strike an obstruction, outer sections of the arm deflect and cause an audible or visual alarm signal to be produced.

23 Claims, 6 Drawing Sheets

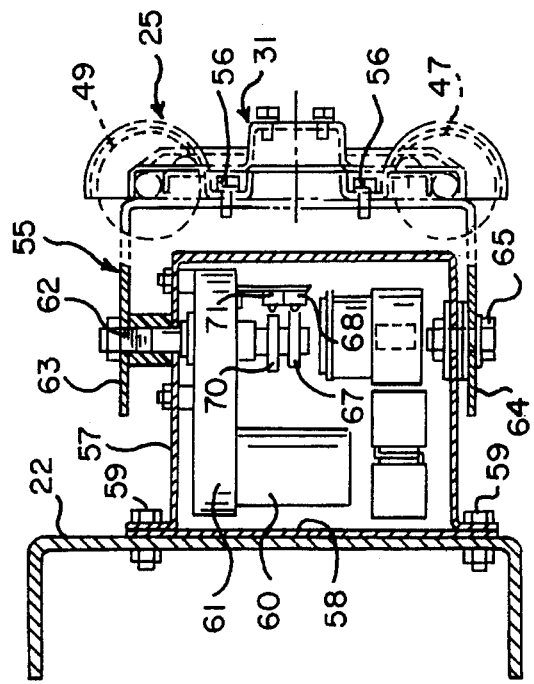
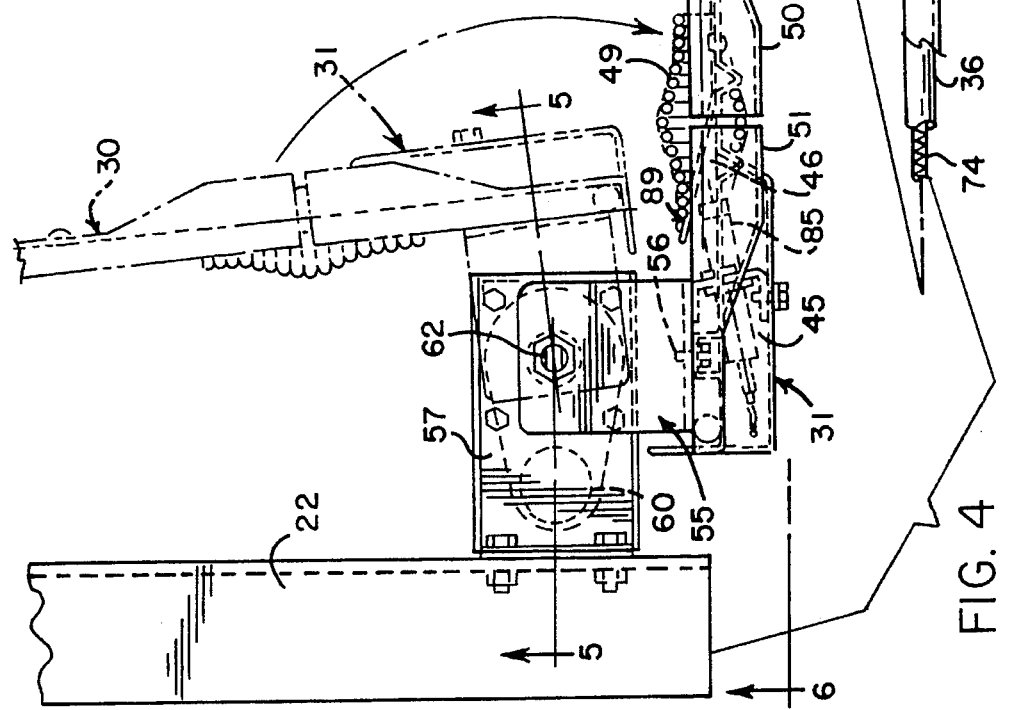
FIG. 5
FIG. 4

SAFETY APPARATUS FOR A SCHOOL BUS

BACKGROUND OF THE INVENTION

The present invention relates generally to safety apparatus mountable on the front of a school bus or the like and, more particularly, to apparatus which swings into outwardly extending relation with the front of the bus when the bus is stopped to load or unload children. When the safety apparatus is in its active outwardly extending position, children are forced to cross in front of the bus sufficiently far ahead of the bus that the children can be seen by the driver and thus the driver can determine when the children are clear of the path of the bus.

The prior art discloses school bus safety apparatus in which a safety arm swings from a retracted position adjacent the front of the bus to an outwardly extending position when the bus is stopped. Apparatus of this type is disclosed, for example, in Wicker U.S. Pat. No. 4,697,541. Even though the safety arm extends outwardly, children can walk around the arm and then walk directly back toward the front of the bus so as to be concealed from the driver.

Percifull U.S. Pat. No. 3,236,552 discloses safety apparatus which, when actuated to an active position, tends to fence off a generally rectangular zone in front of part of the bus. The Percifull apparatus is massive and complex in construction, is susceptible to rattling and vibration when the bus is in transit, requires hydraulic actuation, and leaves a substantial area in front of the driver's side of the bus in an unguarded condition.

SUMMARY OF THE INVENTION

The general aim of the present invention is to provide relatively simple and lightweight school bus safety apparatus which is adapted to more effectively prevent children from walking into a zone in front of the bus and out of the sight of the driver when the bus is stopped for loading and unloading of the children.

A more detailed object is to provide apparatus in which two swinging arms coact with a comparatively simple flexible line to define a fence which encloses a generally rectangular zone of substantial area at the front of the bus and across substantially the entire width of the bus.

A further object is to provide school bus safety apparatus as characterized above which is less susceptible to damage by unintended manipulation by children or by inadvertent opening of the apparatus into obstacles.

Yet another object is to provide safety apparatus of the foregoing type which sounds an alarm in the event the arms or the flexible line are deflected by a child who might attempt to enter the fenced off zone or who might fall or be pushed into that zone.

Still another object is to provide such safety apparatus which is retracted into positive engaging relation with the front of the bus when in its stored position so as to avoid rattling, vibration or damage of the safety apparatus when the bus is in transit.

The invention also resides in the provision of safety apparatus of the above kind which is of economical and lightweight construction capable of being operated by a small d.c. motor powered by the electrical system of the bus.

These and other objects and advantages of the invention will become more apparent from the following detailed description when taken in conjunction with the accompanying drawings.

BRIEF DESCRIPTION OF THE DRAWINGS

FIG. 4 is an enlarged fragmentary top plan view of the apparatus as seen in the direction of the arrows of the line 4—4 of FIG. 2.

FIG. 5 is an enlarged fragmentary cross-section taken substantially along the line 5—5 of FIG. 4.

Figure 1:
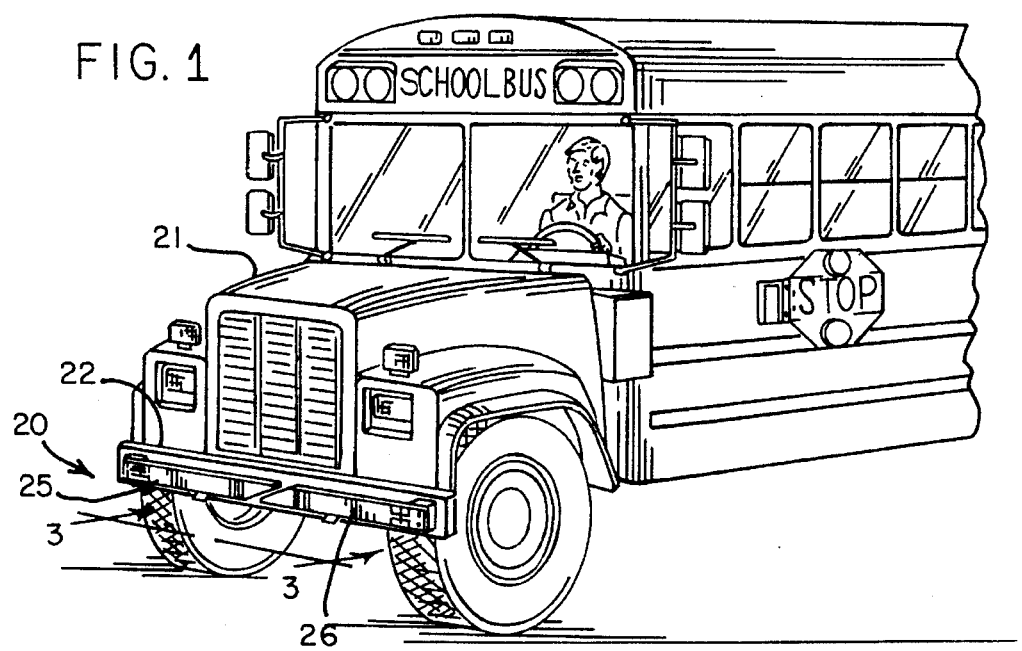
FIG. 1 is a fragmentary perspective view of a typical school bus equipped with new and improved safety apparatus incorporating the unique features of the present invention, the safety apparatus being shown in an inactive stored position.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as incorporated in safety apparatus 20 for use in connection with a vehicle such as a school bus 21 to keep children or other pedestrians a predetermined distance away from the front of the bus when the bus is stopped to load or unload passengers. As will become apparent subsequently, the apparatus forces the children to cross in front of the bus a sufficient distance ahead of the bus that the driver can clearly see the children and determine when the children are safely out of the path of the bus.

The safety apparatus 20 is mounted on the front bumper 22 of the bus 21 and normally is disposed in an inactive or stored position (FIG. 1) lying against the front bumper. When children are being loaded into or unloaded from the bus, the apparatus is actuated to an active or safety position as shown in FIG. 2.

Figure 10:
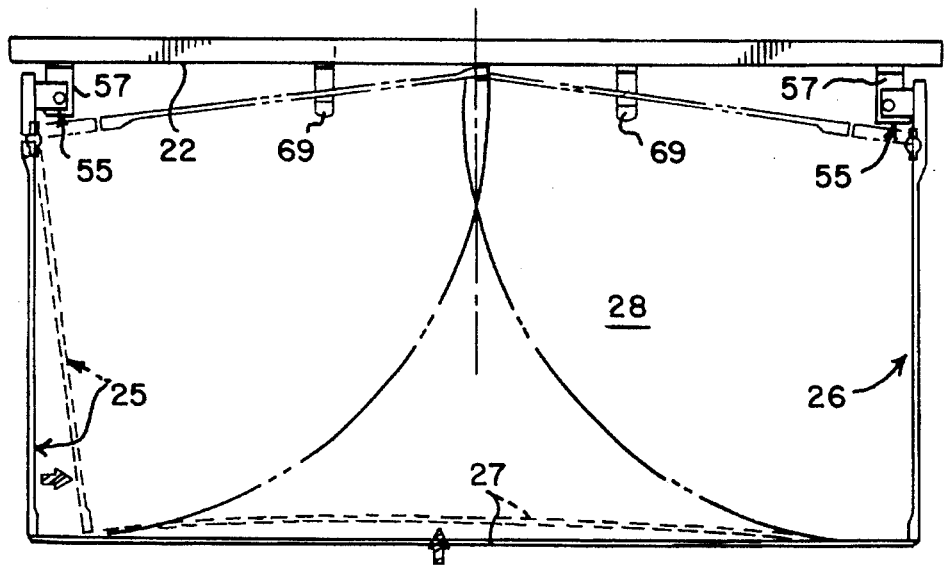
FIG. 10 is a schematic top plan view showing the apparatus in its active position in full lines and in its stored position in phantom lines.

In accordance with the present invention, the apparatus includes a pair of arms 25 and 26 which, when moved from stored positions to active positions, establish laterally spaced fences extending forwardly from opposite sides of the bus 21. The arms carry a flexible line 27 which, upon swinging of the arms to their active positions, automatically establishes a fence extending laterally between the forward free end portions of the arms. Accordingly, the arms 25 and 26 and the line 27 coact to fence off a generally rectangular zone 28 (FIG. 10) in front of the bus across substantially the entire width thereof so that a child is restricted from entering such zone if the child should attempt to walk back or should fall or be pushed back toward the front of the bus after passing around the front of one of the arms. Thus, the arms 25 and 26 and the line 27 help insure that the child is kept in sight of the driver until the child has crossed completely in front of the bus and is out of the path thereof.

The arm 25 is the curbside arm and hereafter will be referred to as the "right" arm, while the arm 26 is the roadside arm and hereafter will be referred to as the "left" arm. The right and left arms 25 and 26 are basically the same but differ in some details as will be explained subsequently. The right arm 25 will be described first. Such arm is formed by an elongated outer section 30 (FIG. 4) and a substantially shorter inner section 31. The outer section comprises a channel-shaped cover 32 which, in this particular instance, is thermoformed from relatively thin and lightweight plastic and has an inner portion 33 and an outer portion 34. The inner portion 33 (FIG. 6) of the cover 32 is generally rectangular in elevation while the outer portion 34 is generally in the form of a right triangle whose hypotenuse defines the lower margin of the cover and slopes upwardly upon progressing forwardly. Vertically extending stiffening ribs 35 are spaced longitudinally along the cover 32 to reinforce the cover and add rigidity thereto.

Figure 6:
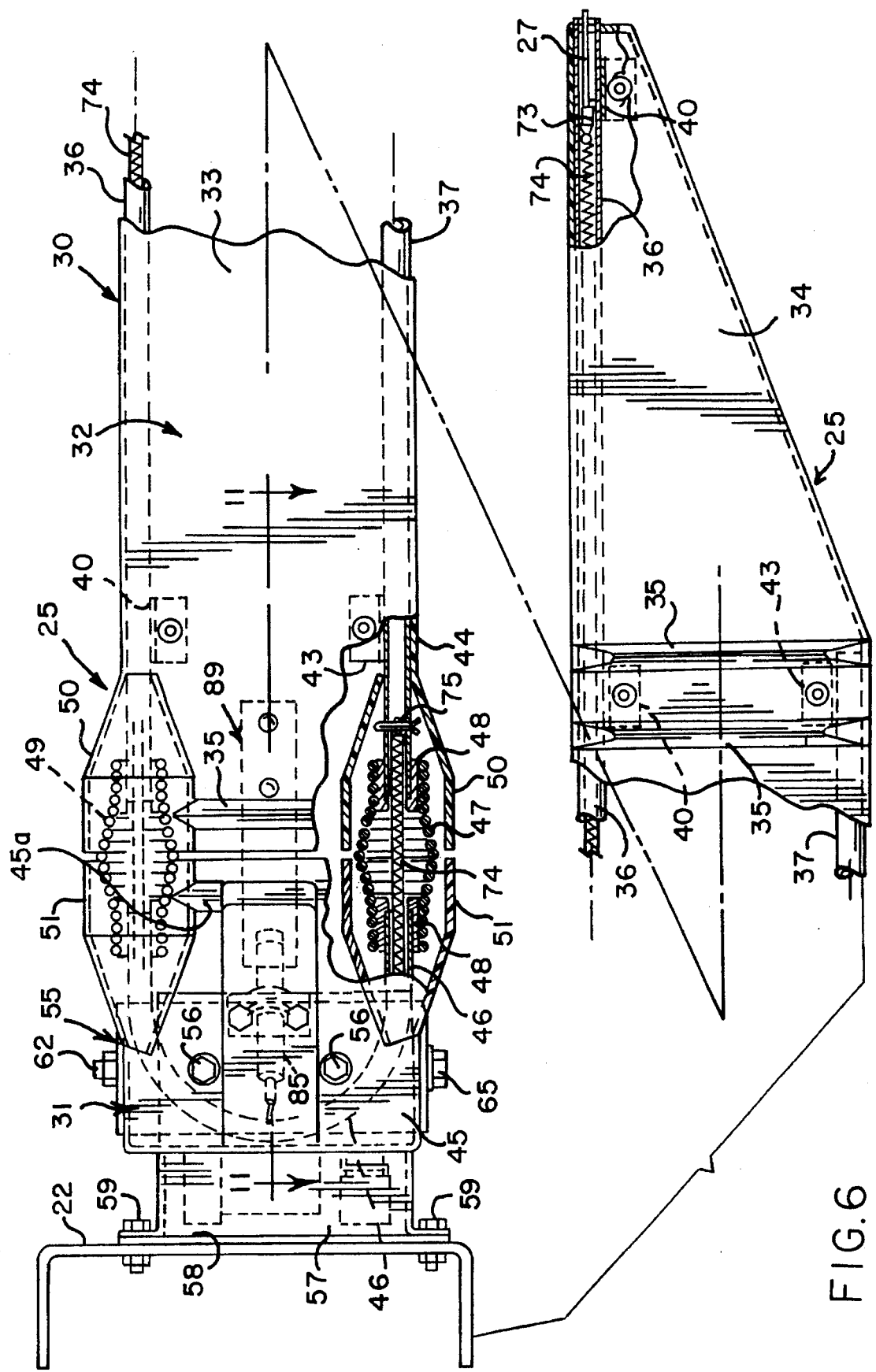
FIG. 6 is a side elevational view of the right safety arm as seen in the direction of the arrows of the line 6—6 of FIG. 4, certain parts being broken away and shown in section.
Figure 8:
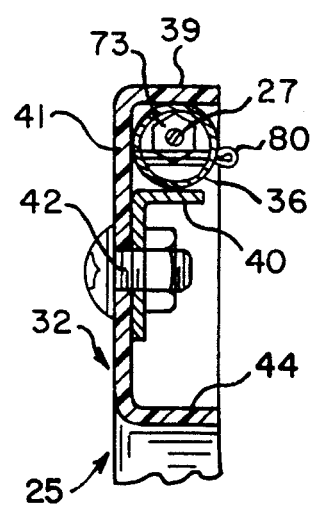
FIG. 8 is a fragmentary cross-section taken substantially along the line 8—8 of FIG. 7.

As shown in FIG. 6, the cover 32 of the outer section 30 of the arm 25 is attached to upper and lower parallel legs or guides which herein are in the form of stainless steel tubes 36 and 37. The upper tube 36 is significantly longer than the lower tube 37 and extends the full length of the cover 32. As shown in FIG. 8, the upper tube is clamped against the upper flange 39 of the channel-shaped cover 32 by a series of longitudinally spaced retaining and generally L-shaped clips 40 which are secured to the upright web 41 of the cover by bolts 42. Similar longitudinally spaced retaining clips 43 (FIG. 6) clamp the lower tube 37 to the lower flange 44 of the cover. The lower tube 37, however, terminates immediately adjacent the triangular portion 34 of the cover as shown in FIG. 6. The web 41 of the cover is located at the outboard sides of the tubes and thus serves to shield the tubes from a passing child so that the child's clothing will not catch on or be snagged or torn by the tubes. Moreover, the web prevents the tubes from being damaged by stones and other material from the roadway when the arms are in their stored positions.

The relatively short inner section 31 of the right arm 25 also includes a generally channel-shaped cover 45 (FIG. 6) which is thermoformed from plastic and which is reinforced by a vertically extending stiffening rib 45a. The cover 45 is attached to and shields the outboard sides of a generally U-shaped guide or bridge tube 46 having outer ends which are aligned with and spaced longitudinally from the inner ends of the upper and lower tubes 36 and 37. The covers 32 and 45 may be formed in the same molding operation and then cut apart. When in place, the covers 32 and 45 are spaced longitudinally from one another and thus are separated by a vertical gap.

For a purpose to be explained subsequently, the inner end portion of the lower tube 37 is connected to the adjacent end portion of the U-shaped tube 46 by a holding means in the form of a coil spring 47 (FIG. 6) whose end portions are contracted around bushings 48 on the end portions of the tubes. A similar spring 49 connects the inner end portion of the upper tube 36 to the adjacent end portion of the U-shaped tube 46. The two springs are formed with enlarged bulbous central portions and normally serve as rigid links between the outer and inner sections 30 and 31 of the arm 25 so as to hold such sections in alignment with one another. The extreme inner end portions of the cover 32 and the extreme outer end portions of the cover 45 are bulged outwardly, upwardly and downwardly as indicated at 50 and 51, respectively, so as to define pockets for receiving and shielding the outboard sides of the springs as well as substantial portions of the tops and bottoms thereof.

Figure 13:
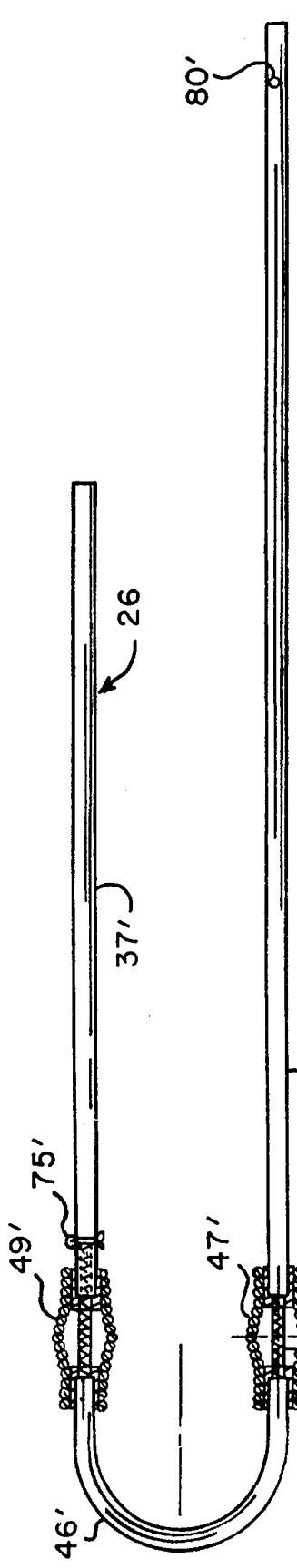
FIG. 13 is a fragmentary side elevational view of certain components of the left safety arm as seen in the direction of the arrows of the line 13—13 of FIG. 2.
Figure 14:
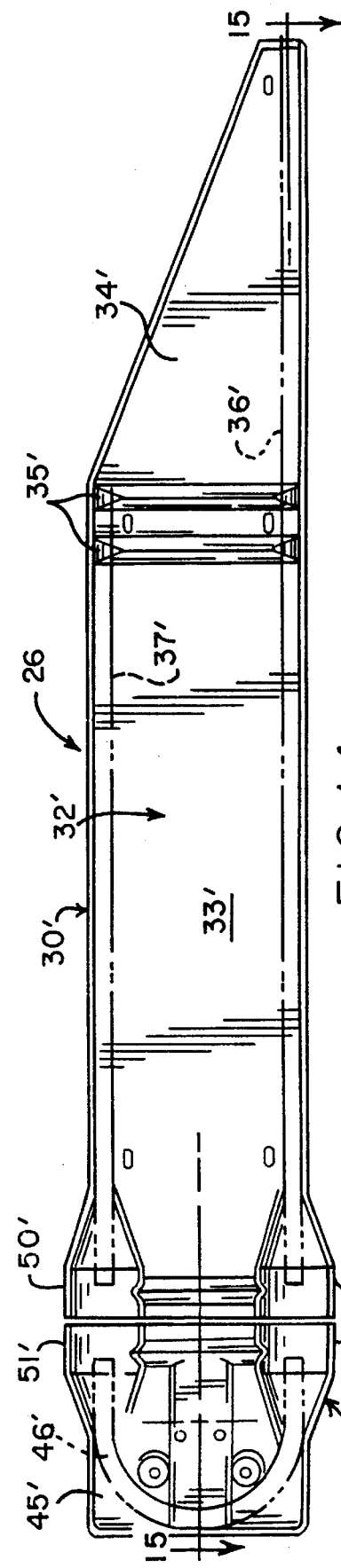
FIG. 14 is a side elevational view of the inboard side of the left safety arm.
Figure 15:
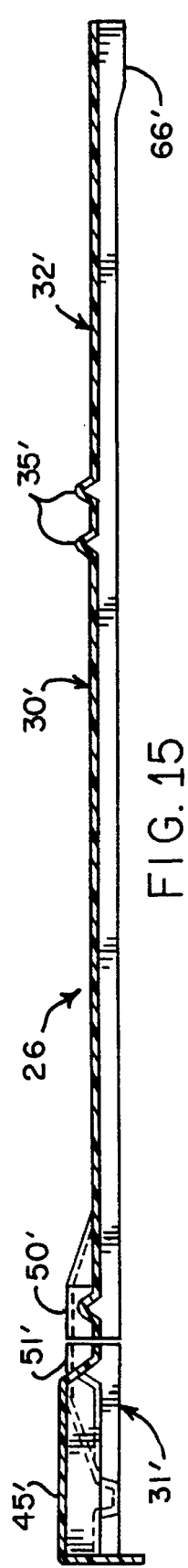
FIG. 15 is a cross-section taken substantially along the line 15—15 of FIG. 14.

The left hand arm 26 is shown in FIGS. 13—15, wherein items similar to those described above have been given similar reference numerals with the distinguishing suffix "'" added outer section 30' of the left-hand arm 26 is defined by an outer cover 32' which is identical to the cover 32 but which is installed in an inverted position so that outer covers from the same mold may be used for both the right and left arms 25 and 26. Thus, as shown in FIG. 14, the cover 32' of the left arm is oriented such that the hypotenuse of the outer cover portion 34' defines the upper margin of the cover and slopes downwardly upon progressing outwardly. In this case, the long tube 36' is secured to the lower margin of the cover 32' while the short tube 37' is secured to the upper margin of the cover.

The inner cover 45 of the right arm 25 is symmetrical about its longitudinal axis and thus a cover from the same mold may be used as the inner cover 45' of the left arm 26 simply by inverting the cover. The left arm 26 includes a U-shaped tube 46' and springs 47' and 49' identical to the tube 46 and the springs 47 and 49 of the right arm.

Each arm 25, 26 includes a generally U-shaped metal yoke 55 (FIGS. 4 and 5) which is attached to the inboard side of the cover 45 of the inner arm section 31 by vertically spaced bolts 56. The yoke 55, in turn, straddles the upper and lower ends of a housing 57 which is attached to the front side of the bumper 22 by an adaptor plate 58 and bolts 59. Different adaptor plates may be used to enable the housing to be attached to different styles of bumpers. The housings for the two arms 25 and 26 are attached to the bumper near the extreme outboard ends thereof. As an alternative to using different adaptor plates, a laterally extending moving tube (not shown) may be interposed between the bumper and the plates 58 of the housings to enable the housings to be attached universally to different types of bumpers.

Located in each housing 57 is a reversible d.c. torque motor 60 (FIG. 5) adapted to be energized from the electrical system of the vehicle. The motor 60 acts through a speed reducer 61 in the housing to drive an upwardly extending output shaft 62 having a square portion which is keyed to the upper leg 63 of the yoke 55. The lower leg 64 of the yoke is pivotally connected to the lower end of the housing at 65 and thus each arm 25, 26 is supported on its respective housing to pivot about a vertical axis.

Figure 2:
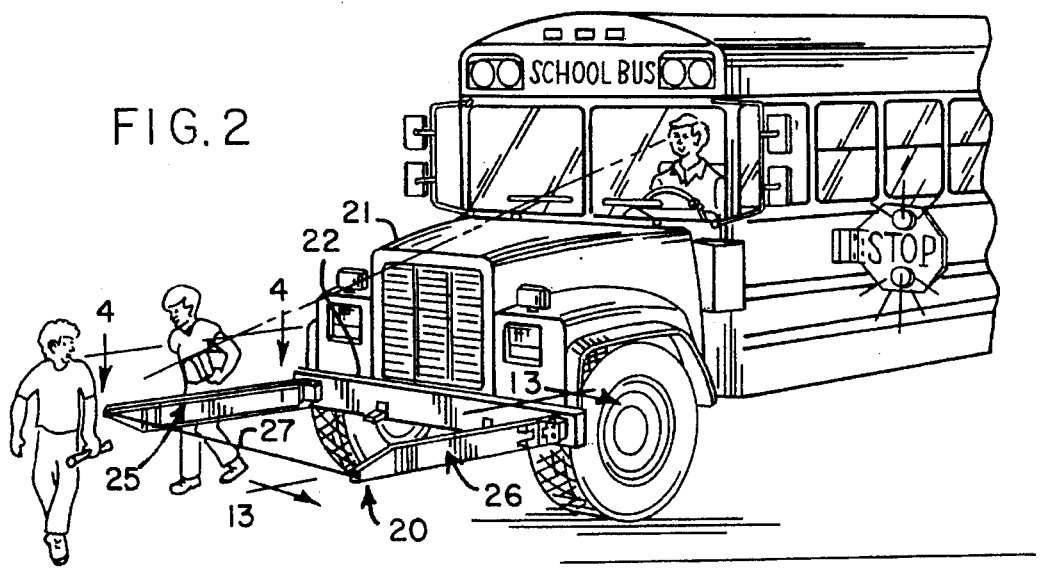
FIG. 2 is a view similar to FIG. 1 but shows the apparatus actuated to an active position.
Figure 3:
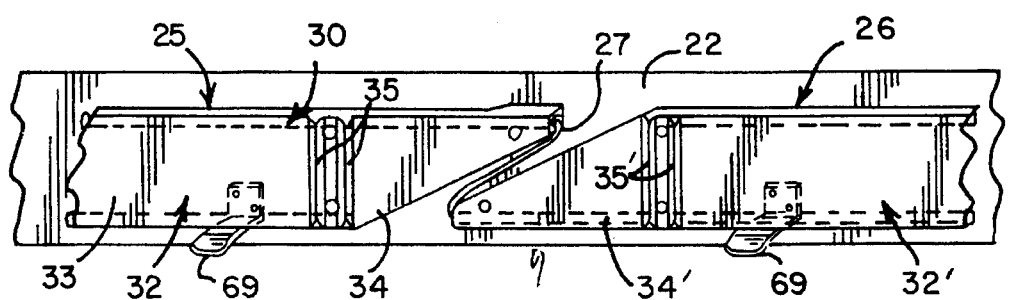
FIG. 3 is an enlarged fragmentary front view of the apparatus as seen in the direction of the arrows of the line 3—3 of FIG. 1.
Figure 9:
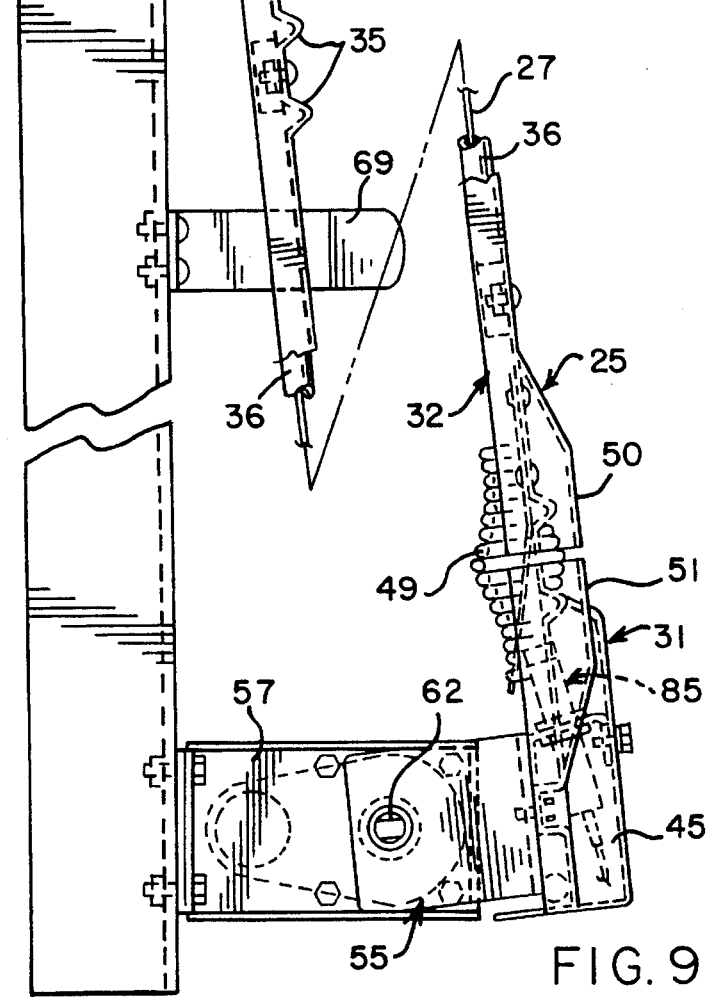
FIG. 9 is a top plan view generally similar to FIG. 4 but shows the right safety arm folded to its stored position.

When the arms 25 and 26 are in their stored positions, they are folded inwardly to a position adjacent the bumper 22 as shown in FIGS. 1, 3 and 9. The free end portion of the cover 32 of each arm is formed with a protruding stop 66 (FIG. 9) which engages the bumper in order to hold the major length of the arm, including the tubes 36 and 37, out of engagement with the bumper and thereby minimize rattling and vibration as well as to prevent damage to the arm and the bumper. As shown in FIG. 3, the free end portion of the arm 26 compactly underlies the free end portion of the arm 25 when the arms are in their stored positions, such underlying relationship being possible by virtue of the triangular and inverted cover sections 34 and 34'.

When the bus stops and its door is opened, the motor 60 of each arm 25, 26 is energized and acts through the speed reducer 61 to swing the arm outwardly about the axis defined by the shaft 62 and the pivot 65. When the arm reaches an active position substantially parallel to the direction of travel of the bus (FIG. 4), a cam 67 (FIG. 5) on the lower end portion of the shaft 62 engages a limit switch 68 to de-energize the motor. The backdriving torque through the speed reducer is sufficient to prevent the arm from pivoting in either direction from its active position when the motor is de-energized.

After the passengers have safely cleared the path of the bus, the motor 60 of each arm 25, 26 is energized in the reverse direction to swing the arm from its active position toward its stored position. As each arm approaches the bumper 22, it rides onto a ramped retaining clip 69 (FIG. 3) on the front of the bumper 22, the clip helping support the weight of the arm and helping retain the arm in its stored position. In addition, the motor 60 continues to drive the output shaft 62 through a few (e.g., six) degrees after the stop 66 engages the bumper. As a result, the yoke 55 and the inner section 31 of the arm pivot inwardly through a slight angle relative to the outer section 30 of the arm to load the springs 47 and 49 and to cause the springs to bias the outer section of the arm against the bumper to prevent rattling, vibration and the like. When the motor has turned the shaft 62 through the required range of motion, a cam 70 (FIG. 5) on the shaft engages a limit switch 71 to de-energize the motor.

Figure 7:
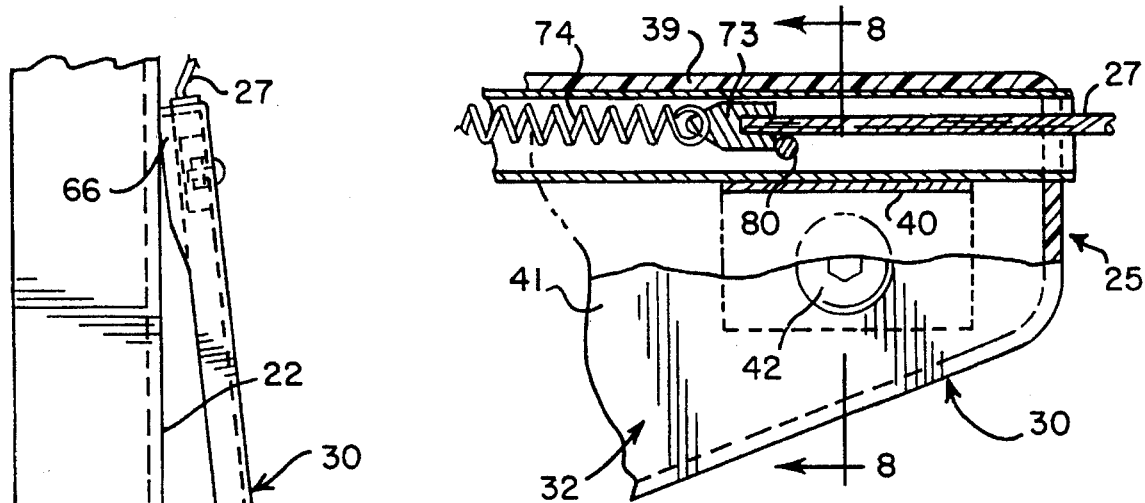
FIG. 7 is an enlarged view of the free end portion of the right arm shown in FIG. 6.

Pursuant to the invention, the line 27 establishes a fence extending laterally between the free end portions of the arms 25 and 26 to restrict children from walking back toward the bus between the arms. Herein, the line 27 is in the form of a stainless steel flexible cable which is coated with nylon or the like. The right end portion of the cable extends into the outer end of the upper tube 36 of the right arm 25, the end portion of the tube projecting outwardly a slight distance from the cover 32 and being polished to reduce abrasion and friction as the cable moves within the tube. The end portion of the cable is soldered or otherwise secured to a block-like anchor 73 (FIG. 7) which is also attached to one end of an extension spring 74. The opposite end portion of the spring is located in the inner end portion of the lower tube 37 and is secured thereto by a cotter pin 75 (FIG. 6). When the arm 25 is in its active position, the spring 74 extends from the lower tube 37, through the U-shaped tube 46 and into the upper tube 36 to the cable anchor 73.

The left end portion of the cable 27 extends into the lower end tube 36' (FIG. 13) of the left arm 26 and is connected to one end of an anchor (not visible) similar to the anchor 73. An extension spring 74' also is connected to the other end of the anchor in the tube 36'. The other end of the spring 74' is connected to the upper tube 37' near the inner end thereof by a cotter pin 75'. When the left arm 26 is swung to its active position, the spring 74' extends out of the upper tube 37' through the U-shaped tube 46' and into the lower tube 36'.

When the arms 25 and 26 are in their stored positions, the springs 74 and 74' act on the cable 27 to retract the cable into the arms. Depending on the length of the cable and the springs, the springs may retract the end portions of the cable into the U-shaped tubes 46 and 46'. As shown in FIG. 3, only a short length of cable extends between the upper end of the arm 25 and the lower end of the arm 26 when the arms are stored.

As the arms 25 and 26 are swung outwardly toward their active positions, the cable 27 is pulled out of the free end portions of the arms during spreading of the arms. As a result, the springs 74, 74' are stretched and apply tension to the cables. Just before the arms reach their fully extended positions, the anchor 73 engages a stop pin 80 (FIG. 7) attached to the free end portion of the tube 36 near the free end thereof and stops further extension of the spring 74. At the same time, the anchor of the left arm 26 engages a similar stop pin 80' (FIG. 13) near the free end of the tube 36' to stop extension of the spring 74'. As a result, and by using a cable of proper length, final movement of the arms 25 and 26 to their extended positions pulls the cable 27 taut between the free end portions of the arms. The cable thus extends laterally between and generally perpendicular to the arms and cooperates with the arms to fence off the generally rectangular zone 28 (FIG. 10) spanning substantially the entire width of the bus 21 and extending a substantial distance in front of the bus. By virtue thereof, children crossing in front of the right arm 25 are restricted from returning toward the bus and thus are forced to remain in clear view of the driver. As the arms are returned to their stored positions, the springs retract the cable into the tubes 36 and 36' and, as pointed out above, may retract the inner end portions of the cable into the U-shaped tubes 46 and 46'.

Figure 11:
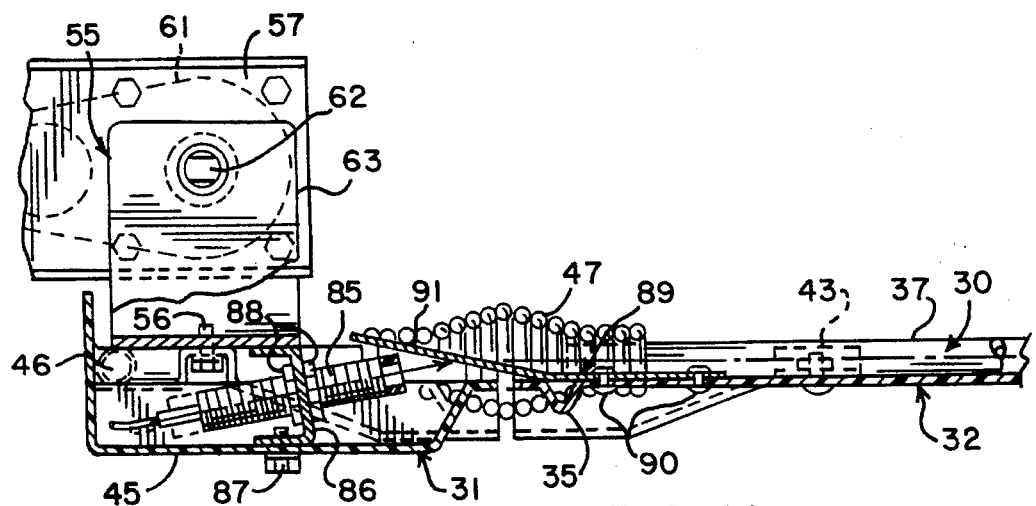
FIG. 11 is an enlarged view of a portion of the arm of FIG. 4 but with certain components broken away and shown in section.

Advantageously, the springs 47 and 49 not only bias the outer sections 30, 30' of the arms 25 and 26 against the bumper 22 when the arms are stored but also enable the outer sections 30, 30' to deflect and cause a warning signal to be produced if a child engages either of the arms or the cable 27. For this purpose, the inner section 31, 31' of each arm carries a sensor which herein is in the form of a proximity switch 85 (FIG. 11) which is triggered only when a metal object approaches the switch. The proximity switch is connected into an electrical circuit having an alarm buzzer, a warning light or other signaling device located in the bus. Each proximity switch is supported by a bracket 86 which is secured by a screw 87 to the cover 45, 45' of the inner section 31, 31' of the respective arm. The housing of the switch is exteriorly threaded and is clamped to the bracket by two nuts 88 located on opposite sides of the bracket.

Figure 12:
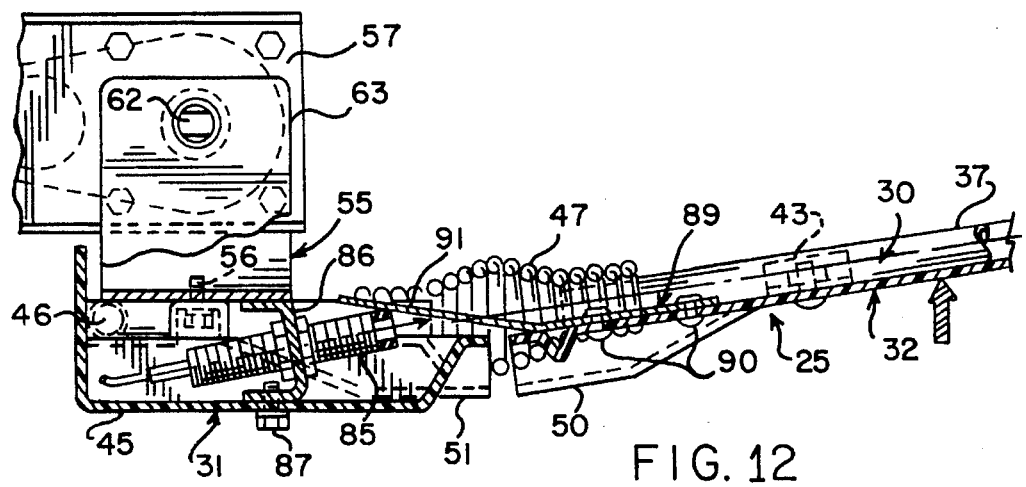
FIG. 12 is a view similar to FIG. 11 but shows certain components of the arm in moved positions.

Co-acting with each proximity switch 85 is a target in the form of a spring metal plate 89 having one end portion riveted at 90 to the cover 32, 32' of the outer section 30, 30' of the respective arm and having an inwardly inclined free end portion 91 extending rearwardly toward the proximity switch. When the arms 25 and 26 are extended and the outer section 30, 30' of each arm is in line with the inner section 31 thereof—as is normally the case—the free end portion 91 of the target plate 89 is spaced sufficiently far from the proximity switch 85 that the switch is not triggered. If a child walks into or is pushed into an arm, however, the outer section of the arm deflects laterally inwardly as permitted by the springs 47 and 49 as shown in FIG. 12 and in phantom in FIG. 10. The free end portion 91 of the target plate 89 thus approaches the proximity switch to close the switch and trigger the warning device. The warning device also will be triggered if the outer section 30 of the arm should happen to hit an obstruction during outward swinging of the arm to its active position. The sensitivity of the proximity switch may be regulated by adjusting the switch relative to the bracket 86 as permitted by the nuts 88 so as to change the initial distance between the switch and the free end portion 91 of the target plate 89.

Importantly, the warning device also is triggered if the cable 27 is deflected either rearwardly or upwardly or downwardly by a child engaging the cable. The cable is shown in a rearwardly deflected condition in FIG. 10. When the cable is so deflected, the anchors 73 act against the stops 80, 80' and cause the outer sections 30, 30' of the arms to deflect inwardly (as shown by the phantom line position of the arm 25 in FIG. 10) and thereby trigger the proximity switch 85. Similar inward deflection of the outer sections of the arms occurs if the cable is pulled upwardly or downwardly from its normal horizontal position.

From the foregoing, it will be apparent that the present invention brings to the art new and improved safety apparatus 20 in which the cable 27 co-acts with the arms 25 and 26 to fence off a safety zone in front of the bus. If the arms or the cable are struck or if an obstruction is encountered during outward actuation, the springs 47 and 49 allow the outer sections 30 of the arms to yield and cause an alarm signal to be produced. Moreover, deflection of the outer sections of the arms as permitted by the springs 47 and 49 protects the motor 60 and the speed reducer 61 if an obstruction is encountered since the only torque applied to the shaft 62 is the force resulting from deflection of the springs. In addition, the springs 47 and 49 bias the arms to stored positions against the bumper 22 to prevent rattling and damage.

I claim:

1. A vehicle having a safety apparatus for keeping pedestrians a predetermined distance away from the front of the vehicle, said apparatus comprising a pair of arms attached to the front of the vehicle near opposite lateral sides thereof for pivotal movement relative to the vehicle between a stored position and an active position, a drive for moving said arms between said stored and active positions, said arms being foldable adjacent the front of the vehicle when in said stored positions and forming laterally spaced fences extending forwardly from the vehicle when in said active position, and an elongated flexible line extendable from free end portions of said arms as an incident to pivotal movement of said arms to said active position for forming a laterally extending fence between the free end portions of said arms which closes off a substantially rectangular zone in front of the vehicle and restricts access of pedestrians to said zone.

2. The vehicle as defined in claim 1 in which each arm includes inner and outer sections, means connecting the outer section of each arm to the inner section thereof and normally holding the outer section in a predetermined position relative to said inner section, said connecting means yielding and permitting said outer section to deflect laterally inwardly relative to said inner section when a laterally inwardly directed force is applied to said outer section.

3. The vehicle as defined in claim 2 further including means responsive to deflection of the outer section of each arm for producing a warning signal indicating such deflection.

4. The vehicle as defined in claim 3 in which said connecting means permit the outer section of each arm to flex laterally inwardly relative to the inner section thereof when a rearwardly, upwardly or downwardly directed force is applied to said line.

5. The vehicle as defined in claim 4 in which said connecting means comprise spring means for biasing the outer section of each arm against the front of the vehicle when said arms are in said stored position.

6. The vehicle as defined in claim 1 in which the free end portion of one of said arms underlies the free end portion of the other of said arms when said arms are in said stored 7. The vehicle as defined in claim 1 further including retaining means on the front of the vehicle for releasably holding said arms in said stored position.

8. The vehicle as defined in claim 1 in which each said arm has a first section pivotally attached to the front of said vehicle and a second section extending outwardly from said first section, and a resilient connector between the first and second sections of each arm.

9. The vehicle of claim 8 in which said resilient connector of each arm includes at least one spring.

10. The vehicle as defined in claim 9 in which said spring of each arm biases the second section of each arm against the front of the vehicle when said arms are in said stored position.

11. The vehicle as defined in claim 8 in which said second section of each arm is deflectable relative to said first section when a predetermined force is applied thereto, and including an alarm responsive to a predetermined deflection of said second section of each arm relative to the first section thereof for producing a warning signal indicating such deflection.

12. The vehicle as defined in claim 1 including a spring in cooperative relation with said flexible line for retracting said flexible line inwardly relative to at least one of said arms when said arms are moved into said stored position.

13. The apparatus as defined in claim 1 in which said arms include tubular members, and said flexible line is disposed within and drawn from at least one of said tubular members when said arms are moved to said active position.

14. A vehicle having a safety apparatus for keeping pedestrians a predetermined distance away from the front of the vehicle, said apparatus comprising a pair of arms, means for attaching said arms to the front of the vehicle near opposite lateral sides thereof and supporting said arms to pivot relative to the vehicle from a stored position to an active position, selectively operable means for moving said arms between said positions, said arms being folded adjacent the front of the vehicle when in said stored position and forming laterally spaced fences extending forwardly from the vehicle when in said active position, and an elongated flexible line carried by said arms and extending between free end portions of said arms, said flexible line automatically forming a laterally extending fence between the free end portions of said arms in response to pivoting of said arms to said active position for closing off a substantially rectangular zone in front of the vehicle and restricting access of pedestrians to said zone, connecting means for attaching the ends of said line to said arms, at least one of said connecting means including means permitting said line to play out from the respective arm when said arms are pivoted from said stored position to said active position and drawing said line relative to the respective arm when said arms are pivoted from said active position to said stored position.

15. A vehicle having a safety apparatus for keeping pedestrians a predetermined distance away from the front of the vehicle across substantially the entire width thereof, said apparatus comprising a pair of arms each having an inner section and an outer section, means normally holding the sections of each arm together as a unit and yielding to permit deflection of the outer section relative to the inner section, means for attaching the inner sections of said arms to the front of the vehicle near opposite lateral sides thereof and supporting said arms to pivot from a stored position to an active position, selectively operable means for moving said arms between said positions, said arms being folded adjacent the front of the vehicle when in said stored position and forming laterally spaced fences extending forwardly from the vehicle when in said active position, an elongated flexible cable attached to said arms, spring means in cooperative relation with said cable for retracting said cable inwardly relative to at least one of said arms when said arms are in said stored position, said spring means yielding and permitting said cable to pull out of said one arm and form a laterally extending fence between the free end portions of said arms in response to pivoting of said arms to said active position, said fences closing off a substantially rectangular zone in front of the vehicle across substantially the entire width thereof so as to restrict access of pedestrians to said zone.

16. The vehicle as defined in claim 15 in which said selectively operable means rearwardly pivots the inner and outer sections of each of said arms as a unit toward said stored position until the outer section of each arm engages and stops against the front of the vehicle whereupon said selectively operable means pivot the inner section of each arm a short distance rearwardly relative to the outer section of the respective arm, said holding means comprising second spring means for biasing the outer section of each arm against the front of the vehicle when the inner section of the arm is pivoted rearwardly relative to the outer section thereof.

17. A vehicle having a safety apparatus for keeping pedestrians a predetermined distance away from the front of the vehicle, said safety apparatus comprising a pair of arms, means for attaching said arms to the front of the vehicle near opposite lateral sides thereof and supporting said arms to pivot relative to the vehicle from a stored position to an active position, selectively operable means for moving said arms between said positions, said arms being folded adjacent the front of the vehicle when in said stored position and forming laterally spaced fences extending forwardly from the vehicle when in said active position, an elongated flexible line carried by said arms and extending between free end portions of said arms, said flexible line automatically forming a laterally extending fence between the free end portions of said arms in response to pivoting of said arms to said active position for closing off a substantially rectangular zone in front of the vehicle and restricting access of pedestrians to said zone, extension springs carried by said arms and attached to the ends of said line, said springs extending to permit said line to be drawn from the free end portions of said arms as said arms are pivoted from said stored position to said active position, and said springs contracting to retract said line relative to the free end portions of said arms as said arms are pivoted from said active position to said stored position.

18. The vehicle as defined in claim 17 further including means for limiting extension of said springs to a predetermined length during pivoting of said arms toward said active positions thereby to cause said line to be in a taut condition when said arms reach said active position.

19. The vehicle as defined in claim 17 in which each arm includes a respective substantially U-shaped guide, each said U-shaped guide having upper and lower legs with inner ends and having a curved bridge extending between the inner ends of the legs of the respective guide, the spring of each arm being located within the respective guide of the arm and being disposed in said legs and said bridge when the arm is in its active position.

20. The vehicle as defined in claim 19 in which the legs of each guide are defined by elongated tubes, the bridge of each guide being defined by a curved tube, each arm having an outer section which includes said elongated tubes and having an inner section which includes said curved bridge, means connecting the outer section of each arm to the inner section thereof and normally holding the outer section in a predetermined position relative to the inner section, said connecting means yielding and permitting said outer section to deflect laterally inwardly relative to said inner section when a laterally inwardly directed force is applied to said outer section.

21. The vehicle as defined in claim 20 in which said connecting means comprise upper and lower coil springs connecting the elongated tubes of each arm to the curved bride of the arm.

22. The vehicle as defined in claim 21 in which each arm further includes an outer cover shielding the outboard sides of said elongated tubes and the outboard sides of portions of said upper and lower coil springs, each arm further including an inner cover shielding the outboard side of said curved bridge and the outboard sides of other portions of said upper and lower coil springs.

23. The vehicle as defined in claim 22 in which said covers are molded of plastic.

* * * * *